United States Patent
King

(10) Patent No.: US 10,100,556 B2
(45) Date of Patent: Oct. 16, 2018

(54) DOOR AND HOME SECURITY SYSTEM AND METHOD

(71) Applicant: Rudolf King, Altenstadt (DE)

(72) Inventor: Rudolf King, Altenstadt (DE)

( * ) Notice: Subject to any disclaimer, the term of this patent is extended or adjusted under 35 U.S.C. 154(b) by 0 days.

(21) Appl. No.: 15/507,812

(22) PCT Filed: Jun. 22, 2015

(86) PCT No.: PCT/EP2015/063971
§ 371 (c)(1),
(2) Date: Mar. 1, 2017

(87) PCT Pub. No.: WO2016/034297
PCT Pub. Date: Mar. 10, 2016

(65) Prior Publication Data
US 2017/0284129 A1    Oct. 5, 2017

(30) Foreign Application Priority Data

Sep. 2, 2014 (DE) .................... 20 2014 007 174 U

(51) Int. Cl.
*E05B 39/04* (2006.01)
*G08B 21/04* (2006.01)
(Continued)

(52) U.S. Cl.
CPC ............ *E05B 39/04* (2013.01); *E05B 43/005* (2013.01); *G08B 13/19695* (2013.01);
(Continued)

(58) Field of Classification Search
CPC .... E05B 39/04; E05B 47/0012; E05B 43/005; E05B 2047/002; E05B 2047/0024; E05B 2047/0068; E05B 2047/0069; G08B 21/04; G08B 13/9695; G08B 13/04; G08B 13/08; G08B 25/008

USPC .................... 340/5.28, 547; 70/129
See application file for complete search history.

(56) References Cited

U.S. PATENT DOCUMENTS 5,946,955 A    9/1999   Suggs et al.
6,886,305 B2 *  5/2005   Ward .................. E05B 47/0047
                                                 292/341.16
(Continued)

FOREIGN PATENT DOCUMENTS

EP    1679672 A1    7/2006
EP    2642457 A2    9/2013
(Continued)

OTHER PUBLICATIONS

Int'l Preliminary Report on Patentability dated Aug. 17, 2016 in Int'l Application No. PCT/EP2015/063971.
(Continued)

*Primary Examiner* — Ali Neyzari
(74) *Attorney, Agent, or Firm* — Panitch Schwarze Belisario & Nadel LLP

(57) ABSTRACT

A door security system and method may increase the home security for elderly people without limiting the privacy of or convenience for residents. The method comprises detecting closing of a door; keeping a first locking mechanism of said door in an open position for a first predetermined period of time after said closing; after said predetermined period of time, changing said first locking mechanism into a locked position. The re-entry time frame permits a user to re-enter without a key, immediately after realizing they forgot it. The method may further comprise recognizing motion of a person on a door of a house through a camera provided in or near the door; producing streaming footage; sending the streaming footage to a central processing server; processing the streaming footage for face recognition purpose and checking against several; and storing all data on the server.

19 Claims, 3 Drawing Sheets detecting the closing of a door keeping a first locking mechanism of said door in an open position for a first predetermined period of time after said closing after said predetermined period of time, changing said first locking mechanism into a locked position

(51) Int. Cl.
*E05B 43/00* (2006.01)
*G08B 13/196* (2006.01)
*G08B 25/00* (2006.01)
*E05B 47/00* (2006.01)

(52) U.S. Cl.
CPC .......... *G08B 21/04* (2013.01); *G08B 25/008* (2013.01); *E05B 2047/0068* (2013.01); *G07C 2209/08* (2013.01)

(56) References Cited

U.S. PATENT DOCUMENTS 8,624,736 B2 * 1/2014 Gore .................. G08B 13/04
292/38
2003/0122387 A1 7/2003 Ward
2008/0236214 A1 10/2008 Han

FOREIGN PATENT DOCUMENTS

| WO | 3966467 A1 | 12/1999 |
| WO | 2005038175 A1 | 4/2005 |
| WO | 2007120794 A2 | 10/2007 |
| WO | 2011161589 A1 | 12/2011 |

OTHER PUBLICATIONS

Written Opinion dated May 27, 2016 in Int'l Application No. PCT/EP2015/063971.
Int'l Search Report dated Dec. 14, 2015 in Int'l Application No. PCT/EP2015/063971.

* cited by examiner

DOOR AND HOME SECURITY SYSTEM AND METHOD

CROSS-REFERENCE TO RELATED APPLICATIONS

This application is a Section 371 of International Application No. PCT/EP2015/063971, filed Jun. 22, 2015, which was published in the English language on Mar. 10, 2016, under International Publication No. WO 2016/034297 A1 and the disclosure of which is incorporated herein by reference.

BACKGROUND OF THE INVENTION

The present invention relates to a door and home security system and method. More particularly, the present invention provides a door security system and a method improving security at home for elder people without limiting the privacy of or convenience for residents.

The present generation of elderly people remains more active than ever. Rather than moving into specially observed hones and retirement homes, they regard their own homes, having lived there for a long time, the ideal place to live after retirement and arrange themselves accordingly; this is a generational change that has happened only within the last 15 to 25 years. Before then, retirees usually considered moving to a retirement home or a living facility at a much earlier age than nowadays. Presently, retirement homes are used more to help those with pressing diseases such as dementia or other ailments requiring around-the-clock care.

However or due to said societal changes, retirees are considered perfect prey for devious kinds of villains; elderly being attacked in their own homes by fraudsters has evolved into a full industry. Even violent acts against retirees have been heard of; apprehensive in assaulting younger victims, some criminals consider the fragility of the elderly a perfect opportunity for enacting heinous crimes.

Therefore, security systems were developed basically comprising of easy and cost-efficient to install cheap surveillance materials in every room, from the bathroom to the kitchen, telecasting every movement to a supervision centre, much like the 'Big Brother" TV series of the early millennium. However, this is an unacceptable invasion of privacy. Furthermore, constant supervision of such systems would not be financially viable as it constantly demands manpower to attend and supervise even a single-person household. Further, doors as used in private and public buildings are usually locked and secured using a number of different locking systems. For example, doors may be equipped with a locking bolt that is turned by a mechanical key or driven electrically. In addition, doors may comprise latches and strikes which allow for opening by pushing the door and/or by pressing handles or turning door knobs from one or both sides.

Residential homes often combine a latch and strike plate with a locking bolt to provide two levels of door security. Also, many doors have a fixed knob on the outside and a handle or turning knob on the inside, such that the door can only be reopened from the outside when a key (or other security means, such as a RFID chip or PIN code entered into a number pad) is used. If the door is quickly closed and the user has forgotten the key, there is no easy way for entering the building again. This seems to happen more often to elderly people such that an efficient and convenient security system and method should also take into account the case of an accidental closing of doors or forgetting the keys inside the building.

Further, the second lock such as the locking bolt then needs to be closed using a key of some kind to provide full security. In most home and burglary insurance contracts, double locking is a requirement for full coverage, yet often forgotten by the insured and in particular by elderly people. In 1997, Belgian police estimated 17% of all doors opened by burglars had only been shut but not locked even once, let alone twice.

Thus, there is a need for a security system and method increasing home security without negative influence on the resident's privacy or convenience.

BRIEF SUMMARY OF THE INVENTION

A door security method according to the appended claims is therefore proposed. In an first exemplary embodiment, a door locking method is provided, comprising detecting closing of a door; keeping a first locking mechanism of said door in an open position for a first predetermined period of time after said closing; after said predetermined period of time, changing said first locking mechanism into a locked position.

Above mentioned method may further comprise, within a second predetermined period of time starting from said locking of said first locking mechanism, enabling unlocking said first locking mechanism by a key feature.

Above mentioned method may further comprise an RFID-Chip, face features, and/or voice features.

In above mentioned method, the key feature or combination of key features comprises face features, wherein the unlocking is enabled if said face feature is comprised in a first database.

Above mentioned method may further comprise, if said face feature is not comprised in the first local database, comparing said face feature with at least one second database and transmitting a warning signal to a central administration if said face feature is comprised in said second database.

Above mentioned method may further comprise, after a third predetermined period of time starting from said closing of said first locking mechanism, changing a second locking mechanism of said door into a locked position.

In above mentioned method, said first locking mechanism allows for opening said door from both sides when in an open position, and locks said door from at least one side when in a closed position.

In above mentioned method, the first locking mechanism is an electric strike lock or an electromagnetic lock.

In above mentioned method, changing said first locking mechanism into a locked position includes blocking a turning knob or a press handle.

Above mentioned method may further comprise sending a locking signal to a monitoring system when said first and/or second locking mechanism has been changed into a locked position.

Above mentioned method may further comprise checking whether said door is reopened during said first predetermined period of time, and, if said door is reopened during said predetermined period of time, detecting a closing of said door and then changing said first locking mechanism into a locked position.

Above mentioned method may further comprise if the resident wears a personal, body worn security device, which measures his movements, a mismatch between his movements and the renewed door opening can be recognised, transmitted to the device and thus the resident is informed about the intrusion In above mentioned method, said databases are disconnected from the Internet at idle times and once a potential threat is detected or remote resources are requested, the databases re-connect to the Internet for a short burst of information.

The present invention also provides a system, comprising a door including a first locking mechanism, at least one driving element enabled to move said first locking mechanism between an open and a closed position, a close detecting element configured to detect the closing state of said door; and wherein said system is adapted for detection of the closing of said door via said close detecting element; keeping said first locking mechanism of said door in an open position for a first predetermined period of time after said closing; and changing said first locking mechanism into a locked position via said driving element after said predetermined period of time.

Above mentioned system may further comprise a camera arranged in or on the door; a computing unit adapted for, within a second predetermined period of time starting from said locking of said first locking mechanism, enabling unlocking said first locking mechanism by a key feature.

Above mentioned system may further comprise means for communicating data via at least one suitable data transmission technique.

In above mentioned system the door further may comprise a second locking mechanism and at least one driving element enabled to move said second locking mechanism between an open and a closed position, the driving element being arranged to change said second locking mechanism of said door into a locked position after a second predetermined period of time starting from said locking of said first locking mechanism.

In above mentioned system, said driving element includes a timer, wherein said first and/or second predetermined periods of time are determined by said timer.

In above mentioned system, said driving element includes a connection adapted for receiving a driving command.

In above mentioned system, said first locking mechanism is an electrical strike or an electromagnetic lock.

In above mentioned system, said second locking mechanism is a bolt lock.

In a second exemplary embodiment of the present invention, a method for door lock security is provided, comprising recognizing a motion of a person on a door of a house through a camera provided in or near the door; producing streaming footage through a video camera; sending the produced streaming footage to a central processing server hidden inside the house; processing the streaming footage for face recognition purpose and checking against several databases in order to assess, if the person on the outside is either a person positively marked by the homeowner, such as friend and family, or negatively marked; and storing all data on the server.

The method of the second embodiment may further comprise transmitting a photo captured by the camera or the video camera of a person asking to enter the house to a mobile device of a resident of the house; and remotely opening the door if the resident confirms the persons permission to enter the house.

The above described method of the second embodiment may further comprise uploading a photo of a person getting permission to enter the building for a present time to the server; once a person buzzes the door, if the internal database recognizes similarity to the profile photo and given the preset time restraints are met, allowing entry to the house; and if it is another person or the time restraint is not met, denying access and informing the resident.

The above described method of the second embodiment may further comprise choosing at least one picture among a plurality of pictures of the produced streaming footage by using triangulation of facial features to estimate which of the photos (snippets) is/are most suitable for applying a recognition software; and using face recognition software on the at least one snippets to capture the facial features of the person, gender and age range of the person or persons assessed.

The above described method of the second embodiment may further comprise checking the snippet(s) against at least one database by comparing among other features data obtained from the face recognition software; calculating the probability that the person on the outside is either a person positively marked by the resident, such as friend and family, marked by the resident as a stalker, or negatively marked by security forces; and presenting the results on a screen indoors and/or on a mobile device of the resident.

In above described method of the second embodiment said server is disconnected from the Internet at idle times and once a potential threat is detected or remote resources are requested, the server re-connects to the Internet for a short burst of information.

The present invention further provides a storage medium containing computer program code which if executed by a computer is suitable to perform any of the methods according to above description.

In an exemplary embodiment, the method comprises detecting closing of a door; keeping a first locking mechanism of said door in an open position for a first predetermined period of time after said closing; after said predetermined period of time, changing said first locking mechanism into a locked position. The re-entry time frame permits a user to re-enter without a key, immediately after realizing they forgot it. In another embodiment, the method may further comprise, within a second predetermined period of time starting from said closing of said door enabling unlocking said first locking mechanism by a key feature. Said key feature may be any signal or device other than the normal key corresponding to the door lock. E.g. the key feature may be a RFID-chip carried by the user, checking face features of the person in front of the door by means of a camera, a face recognition software and a database containing face features of a list of people allowed to use the unlocking mechanism, checking voice features of the person in front of the door by means of a microphone, a voice recognition software and a database containing voice features of a list of people allowed to use the unlocking mechanism and/or a combination of said key features. In another embodiment the method further comprises, after a second predetermined period of time starting from said closing of said first locking mechanism, changing a second locking mechanism of said door into a locked position. Using this second time frame, the door may be locked completely and securely without any further interaction from a user.

In another embodiment, said first locking mechanism allows for opening said door from both sides when in an open position, and locks said door from at least one side when in a closed position. This is useful in standard residential doors which may thus be pushed open or opened via a handle during the first time period.

The first locking mechanism may be an electric strike or an electromagnetic lock. In an embodiment of the invention changing said first locking mechanism into a locked position alternatively or additionally include a turning knob or a press handle, such that the door cannot be opened using this element once the first time frame is over.

In another embodiment the method may comprise sending a locking signal to a monitoring system when said first and/or second locking mechanism has been changed into a locked position. In this way the monitoring system can record the locking process for later review and determine irregularities. In another embodiment, the method comprises further checking whether said door is reopened during said first predetermined period of time, and, if said door is reopened during said predetermined period of time, detecting a closing of said door and then changing said first locking mechanism into a locked position. That is to ensure that, if the user re-opens the door during the first time frame and re-enters his home, the door is automatically locked using the first locking mechanism such that no one can open the door from the outside and follow inside.

The invention further relates to a system comprising a door including a first locking mechanism, at least one driving element enabled to move said first locking mechanism between an open and a closed position, a close detecting element configured to detect the closing state of said door; wherein said system is arranged to detect the closing of said door via said close detecting element; keep said first locking mechanism of said door in an open position for a first predetermined period of time after said closing; and change said first locking mechanism into a locked position via said driving element after said predetermined period of time.

The door may further comprise a second locking mechanism and at least one driving element enabled to move said second locking mechanism between an open and a closed position, the driving element being arranged to change said second locking mechanism of said door into a locked position after a second predetermined period of time starting from said locking of said first locking mechanism. The driving elements for the first and second locking mechanisms may be separate or combined into one element. In an exemplary embodiment, said driving element includes a timer, wherein said first and/or second predetermined periods of time are determined by said timer.

Alternatively or additionally, the driving element may include a connection adapted for receiving a driving command.

The locking mechanism may for example be an electrical strike or an electromagnetic lock. The second locking mechanism might be a bolt lock.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Method 1—Automated Door Lock System

Figure 1:
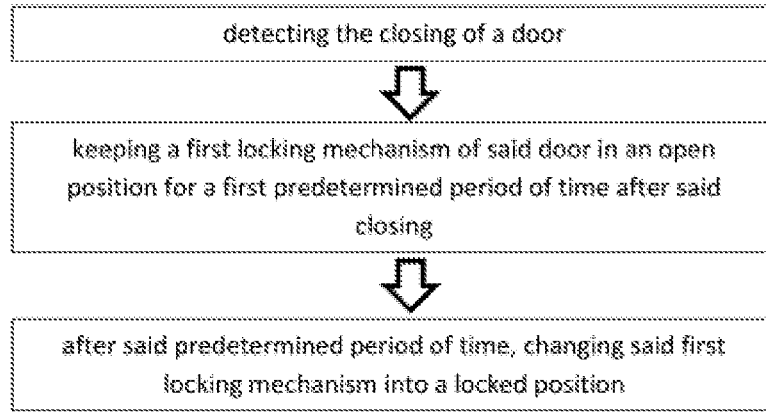
FIG. 1 is a flow chart of a method in accordance with one preferred embodiment of the present invention.

FIG. 1 is a flow chart of a method in accordance with one preferred embodiment of the present invention. A door according to the invention may comprise hardware features such as a door handle, door knob, and different types of door locks. Further, the door may comprise electric strikes, electromagnetic locks, and various types of sensors for detecting a closing and locking state of the door. It will also be understood that a door may usually be equipped with hinges and swings open, but might for example also be a sliding door or a door comprising two door parts with one part being locked to the other when closed. The present invention can be used with virtually any type of door.

The door unit may be able to differentiate between the door being opened from the outside and from the inside. This differentiation can e.g. be made by mechanical, optical or electrical sensors connected to the strikes, latches, handles, and/or knobs. A sensor may be arranged somewhere in the elements of the door as a single or multi-part sensor and then send a signal to a processor or other device when a predetermined event is detected. Such sensors may also be used for detecting whether the door is currently opened or closed, and which locking elements are in a locked state.

According to an embodiment of the invention, once the handle is turned from the inside, the door locks can be opened without use of a key, so the person can quickly move out of the house. Once the door falls into place again, the outside handle is still operational. If there is no outside door handle, the door can be pushed again, so the owner, having realized he forgot the key can, for a predefined time frame of e.g. 3 to 15 seconds, reopen the door and re-enter the house without a key. After that time, the handle is no longer operational on the exterior. The door can only be reopened using a key as described later. That is, after the first predetermined period of time, a first locking element of the door is locked. This may for example be an electronic strike which allows re-entering by pushing the door while it is in an open state, and which is then electrically switched to a closed state after the desired time interval.

After re-entry within the time-frame, the door is simply locked automatically; it cannot be re-opened from the outside, but from the inside with the handle. The sensors within the door or a camera may for example be used to detect whether someone has re-entered during the predetermined time frame.

The door's re-opening may be recorded and processed through databases (e.g. databases 1-5 described below) with a time stamp and the video sequence of a short time before and after the opening until the closing of the door. Such databases may be used to determine whether a person entering the door is an allowed resident or a trespasser, e.g. via face recognition using a video camera or infrared camera. The video sequence may be marked as either delete-able in a longer interval than normal or only manually delete-able, as in this particular case a third person may hide next to the door, out of the camera shot, and use the time interval to open the door, run inside the house and lock the door from the inside.

After yet another time interval, e.g. 15 seconds to three minutes, after a person leaves the home's interior and does not re-enter, the door bolts fully lock (usually a "double lock" as if turning the key twice in a mechanical lock).

If a further monitoring system within the home, such as camera(s), infrared cameras or other sensors combined with corresponding means for data processing or connected to the door lock system, establishes that people are still in the house, this function can be aborted.

The time periods mentioned are merely by way of example and may be changed as suitable. Optionally, the system may be configured by the user such that a comfortable period for both reopening of the door and final double locking can be set.

The combination of two locking methods with preset intervals allows for
- the forgetfulness not only prevalent in elderly people,
- avoids the need to call for a door opening service, which can be very expensive, and
- warrants the full security of burglary insurance even if the user forgets to lock the door.

The homeowner or resident can also open the locked door using a key feature like a manual or electronic key (resembles a standard door key), RFID chip, or a code number which he can type in on the keypad.

If the key carries an electronic distinction, or if the homeowner or resident uses RFID chip or code number which is unique for one person, the system can check in the database if the code or distinction equals the person opening the door. The security unit, concierge service, or the homeowner or resident (or the person whose key etc. has been used) can be contacted, in the latter case, via a smart phone or another communication's device.

The RFID chip is best placed on everyday, non-reading glasses of the user. Glasses are always used by one person only and their absence is noticed immediately upon leaving the house. If missed, the homeowner or resident returns immediately to the house.

As described earlier, if they do not have a key, the short locking delay provides them easy access. Given more and more sensors with unique ID-numbers are presented using RFID to measure body functions, the chip can alternatively be worn anywhere on the body, such as chest, arms or wrist. In another embodiment of the invention, a double locking system according to the invention is combined with other door security measures, for example, a camera system as previously mentioned may be integrated somewhere in the door leaf, door frame, or around the door.

In another embodiment of the invention, the recognition unit may be embedded in a smartphone or -watch either generally or temporarily worn by the home owner.

Method 2—Door Lock Security

Modus Operandi

Figure 2:
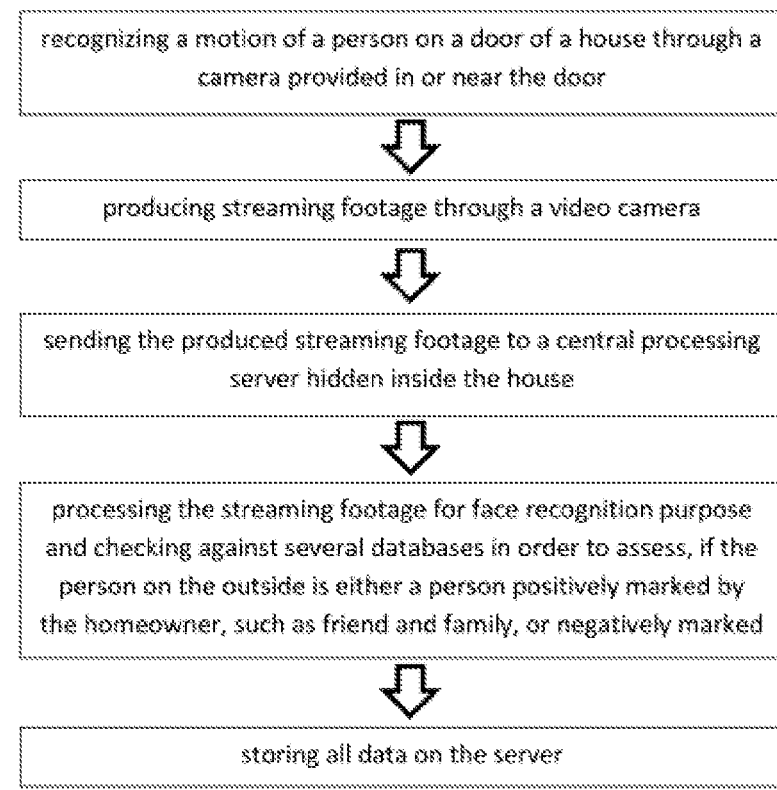
FIG. 2 is a flow chart of a method in accordance with another preferred embodiment of the present invention.

FIG. 2 is a flow chart of a method in accordance with one preferred embodiment of the present invention. Once a person approaches the front door of the user of the door system, a camera or an embedded movement recognition sensor recognizes the motion. Pressing the buzzer sounds the bell in the home's interior, giving the homeowner or resident(s) the possibility for two-way communication. A video camera produces streaming footage which is then wirelessly sent to a central processing server hidden inside the house; the video is processed for face recognition purpose and checked against several databases in order to assess, if the person on the outside is either a person positively marked by the homeowner, such as friend and family, or negatively marked. The homeowner and resident can act accordingly. All data is stored on the server.

Re-Entry Mode of Operation

Using a RFID key feature and a (preferably local) database 1—internal positive—the RFID chip information of the bearer may be compared to the photo stills in the video sequence taken when opening the door. If the still does not match with the photo in the database, the face recognition software runs through all the embedded databases trying to find a match. With or without the match, this information is sent to a predefined unit such as the smart phone of the bearer, and/or the home owner, or a remote call center where they compare the photos and may act accordingly, such as contacting the local police, neighbourhood watch, or other security forces. A key or a key sequence can bear similar information, then the same method applies in other case as well.

If the face recognition software finds a match with a person permitted to use the re-entry mode of the system, the door may be enabled in general without the need for any other key features. The same applies for voice recognition and other key features like personal key numbers or fingerprint recognition.

Concierge Functionality

If the owner plans not to be at home at certain times, while e.g. expecting visitors coming to, deliveries brought to and/or services to be executed inside his house, he can use the tool described below to allow entry into the house.

In a first variation, the system transmits a photo of the person asking to enter the house to, say, a mobile device such as a smart phone or smart watch or other wearable with a photo-enabled display of the homeowner or resident(s), who can then remotely open the door.

In another variation, the homeowner or resident can for a certain time and/or certain time frames allow entry to a person, for example if the homeowner or resident cannot be reached during a certain time or if there is a guest in the house for a predefined time interval. In this case the homeowner or resident uploads a photo of the person supposed to enter the building, such as a profile photo of an employee, a janitor, to the internal positive database 1. Once the person buzzes the door, the internal database recognizes similarity to the profile photo and, given the preset time restraints are met, allows entry to the house; if it is another person or the time restraint is not met, access is denied and the home owner or residents are informed as described above.

During the opening of the door, movements are recorded and stored, making the system safe. Furthermore, if the recognition software realizes more people than allowed enter the building, an alarm can be triggered to a service company, police, other security units and/or the homeowner or resident.

Concierge Functionality for Residents

If the homeowner or resident locks himself out, he can re-enter the home as described above, e.g. either by using the keypad and his personal security code or by pressing the buzzer in a certain way so that the remote call center—provided there is a concierge function—or a neighbourhood watch sees the bearer. Then, his face and/or voice may be compared to the information saved in the database, and the receivers may act accordingly, either by opening the door or by asking further security questions.

Remotely Closing the Door

If for some reason the door remains open for a long period, a warning sign can be sent to the resident(s) and/or a concierge service, who is then remotely enabling the door's electric mechanisms (widely used in fire prevention) to close the door. If the door is found to be locked manually, e.g. by a heavy item or a door stopper, information can be sent to the homeowner and/or resident(s) and/or security forces/the police about the potential problem. In order to not lock out the home owner and or his family, the last video sequence with a motion can be checked before such measures.

Inside Door Locking in Case of Burglary

If burglary is detected inside the building by the embedded video camera of the door and/or the indoor movement surveillance system described below, the door can be locked electronically by a remote center, security unit, the police, or the owner via his smart phone. This removes the possibility of opening the door from the inside. As locking a door from the inside is a very dangerous enterprise, as in the case of a fire, it will stop residents from leaving the house through the standard way, this option must be taken with great caution, in particular only securing the burglars remain inside the building—and possibly, be immediately removed if a fire is detected or a person enters the building who is clearly not a burglar.

From the outside, opening the door is not possible to unsuspecting residents while burglary lock is in progress.

Even if windows are unlocked, allowing the burglar to leave house by opening and climbing out of the window, the locking of the front door hinders the attempts to remove large items, as they are more difficult to lift through windows than to carry them through an opened door.

Hardware Description

The following description is for illustrative purpose only and should not be interpreted to limit the invention. Any parts mentioned herein may be combined or omitted as the skilled person will easily understand. The whole invention revolves around the method which requires remote server, an instrument either hidden in a remote place of the building or stashed/locked in a secure area not easily to be opened, in order to prevent
  tampering by persons not allowed access to the system,
  from destroying evidence collected and
  shutting off the modus operandi required for full protection of house residents.

Both entry door security modules and room security modules are—preferably wirelessly—connected to server D1.

Entry Door Surveillance
A) On the door outside of the home:
As seen from the outside of the door B the following items may be used in this invention:
1) Camera
A peephole as often used in outside doors, in which a video camera is installed either as an independent unit or using a mirror which allows the homeowner or resident to see directly through the peephole, making it impossible to discern if there is only a camera from the outside or a camera with the possibility to look directly through the peephole or alternatively only using the monitor screen on the inside.

In an alternative embodiment of the invention the camera is either invisibly set up or clearly visible as a camera.

2) Movement Recognition
The camera can be on a standby basis, constantly checking for movements outside the door. In an alternate embodiment of the invention, a movement recognition sensor, such as those widely used with infrared or sound recognition, can be applied.

3) Keyhole, Keypad, RFID Sensor
Near the door lock, a keyhole for a normal or electronic key, potentially a keypad, potentially a RFID sensor, and potentially yet least necessarily, a door handle.

4) Buzzer, Microphone, Loudspeaker
A buzzer, microphone, loudspeaker and potentially an LED, used to show:
  the functionality of the system,
  the fact that a motion has been detected and is recorded, and/or
  the use of the microphone and loudspeaker system.

5) Warning Sign
In some constituencies it might be legally mandated to apply a warning sign that movements are stored and recorded.

6) Nightlight
Potentially a light to help visibility during the night.

7) Connection to Unit inside Building
A wireless and/or wired connection to the unit on the door inside of the home. Herein and in the following description, the single term "unit" refers to a subsystem comprising multiple parts sharing a location or area.

8) $2^{nd}$ Camera
Potentially a $2^{nd}$ camera located on the side or above the door to check the surrounding of the door, wirelessly or by wire connected to either the unit on the door inside of the home and/or to the remote server and/or computing unit inside the home.

B) Inside the Door
In the door B the following items may be implemented:
1) Lock Mechanism
A lock mechanism, generally used with a simple and double lock bolt and with a lock, that can be an eternity opened or locked.

2) Motion Sensor
Potentially a motion sensor to recognize attempts to pry the door open.

3) Rechargeable Battery
A rechargeable battery that can only be recharged from the unit inside the home and is otherwise not accessible.

4) Wired or Wireless Connection to Unit in the Building
A wired or wireless connection to the unit inside the home and/or the remote server inside the home.

5) Double Lock Disconnect Unit in Case of Burglary
In the case of a burglary a mechanical disconnect to ensure that the double lock cannot be opened from the inside; that however, can be reconnected immediately, once a fire is detected or the battery unit is close to failing completely.

6) Fire Door Closing Unit
Potentially a fire door closing unit which allows the door to be locked in an open position, but immediately shuts the door upon an electronic signal such as in the case of a fire or the battery fails.

C) On the Door Inside the Building

As seen from inside the home the following items and devices may be implemented in this invention:

1) Handle, Keyhole, Door Lock Opening Knob

A handle and or round knob, potentially a keyhole for a standard key, a door lock opening knob.

2) Batteries

A rechargeable battery, preferably with another rechargeable battery which continues to guarantee functionality of the system for a certain time period once the rechargeable battery is removed/fails.

3) Monitor, Peephole, Touchscreen or Touch Pad

A monitor screen with or without the peephole with a touchscreen surface or a touch pad or a number of at least 3 switches near the monitor.

4) Microphone, Loudspeaker

A microphone, loudspeaker, switch to speak, which can alternatively be embedded in the touchscreen surface or touch pad.

5) Wireless or Wired Connection to Server a wireless and/or wired connection to the remote server inside the home.

D) Hardware Hidden Inside the Building

To ensure a villain cannot easily remove the data collected, the server is preferably placed in a hidden location, hard to find by anyone not familiar with the home. In another, less preferable, embodiment of the invention, the server can be stored outside the building, for example in a server room of a protection company.

1) Server and/or Computing Unit

The server is connected preferably wirelessly to the unit described above and potentially to unit and unit. An outside connection is established with preferably all 3 of the following means:

a) a standard Internet connection, b) a standard land line phone connection, c) a cell phone unit which is hidden inside the server or storage unit and cannot be removed without breaking the server or storage unit.

2) Data Storage Unit

A data storage unit in which all video, photo, and audio files and databases and time stamps are collected and stored.

3) Power Connection and Battery

A power socket connection and a rechargeable battery which is hidden inside the server and cannot be easily removed.

E) Databases

There are up to 5 databases stored in the data storage unit which are constantly used for face and voice recognition.

Database 1—Internal Positive

In the database 1—internal positive the faces and perhaps, the voices of the house owner, family members, and staff permitted entry to the home are stored; they can be changed, deleted and/or updated by the home owner.

Database 2—Internal Negative

In the database 2—internal negative the faces and potentially voices of persons generally denied entry by the homeowner or resident(s) are stored; they can be changed, deleted and updated by the homeowner or resident(s) without consent of police or other persons. It can however be administered, such as in the case of a stalker or a person who has officially been informed that trespassing would not be tolerated, that police, neighborhood watch, the concierge service, another entity or a group of people predefined by the resident, such as family and friends in close neighborhood—hereinafter: the predefined backup security network—is informed immediately upon him committing an offence within the perimeter.

Database 3—Regional

In the database 3—regional local police or another entity can update faces and potentially voices of persons suspect or convicted of crimes, which are known to "work" the regional area at certain times, such as if they have been spotted or even filmed by the tools described herein while trying to commit fraud or another crime on another person in the neighbourhood or city.

Database 4—National

In database 4—national, police or another entity can update faces and, potentially, voices of persons wanted by police warrant and/or convicted of crimes in the country; this might be armed robbery, rape, child molestation etc. In general, they would not be permitted entry to the house.

Database 5—Worldwide

In database 5—worldwide, police or another entity can update faces and, potentially, voices of persons convicted of crimes which are considered so serious, that they should generally not be permitted entry to the house of any unsuspecting person, requiring immediate police action, such as in the case of a fugitive or another criminal of extreme brutality in database 4 who is known to be able to cross borders easily.

The home owner or resident is free to stop the use of database 3-5 or overrule any choice given by the server.

Functionality: Communication between the resident user and any person outside the door—Alternative 1: User is behind door Once a person presses the outdoor buzzer, the home system or a person R on the inside of the home can communicate with the person V on the outside as with a standard communication device.

Functionality: Communication between the user and the person outside the door—Alternative 2: User is not inside building If the homeowner or resident R is not present, the communication can be transmitted via the hidden server to a designated smart phone or other communication device, by means of which the homeowner or resident(s) can see and talk with the person in front of the door. This communication can also be transferred according to the definitions to the concierge service.

Functionality: Movement Detection as Trigger for a Video Sequence

Once movement recognition sensor, and/or camera in standby mode recognize movement in front of the door, camera starts filming the scene of the movement.

Software

A) Software—Movement Detection & Face Recognition

Figure 3:
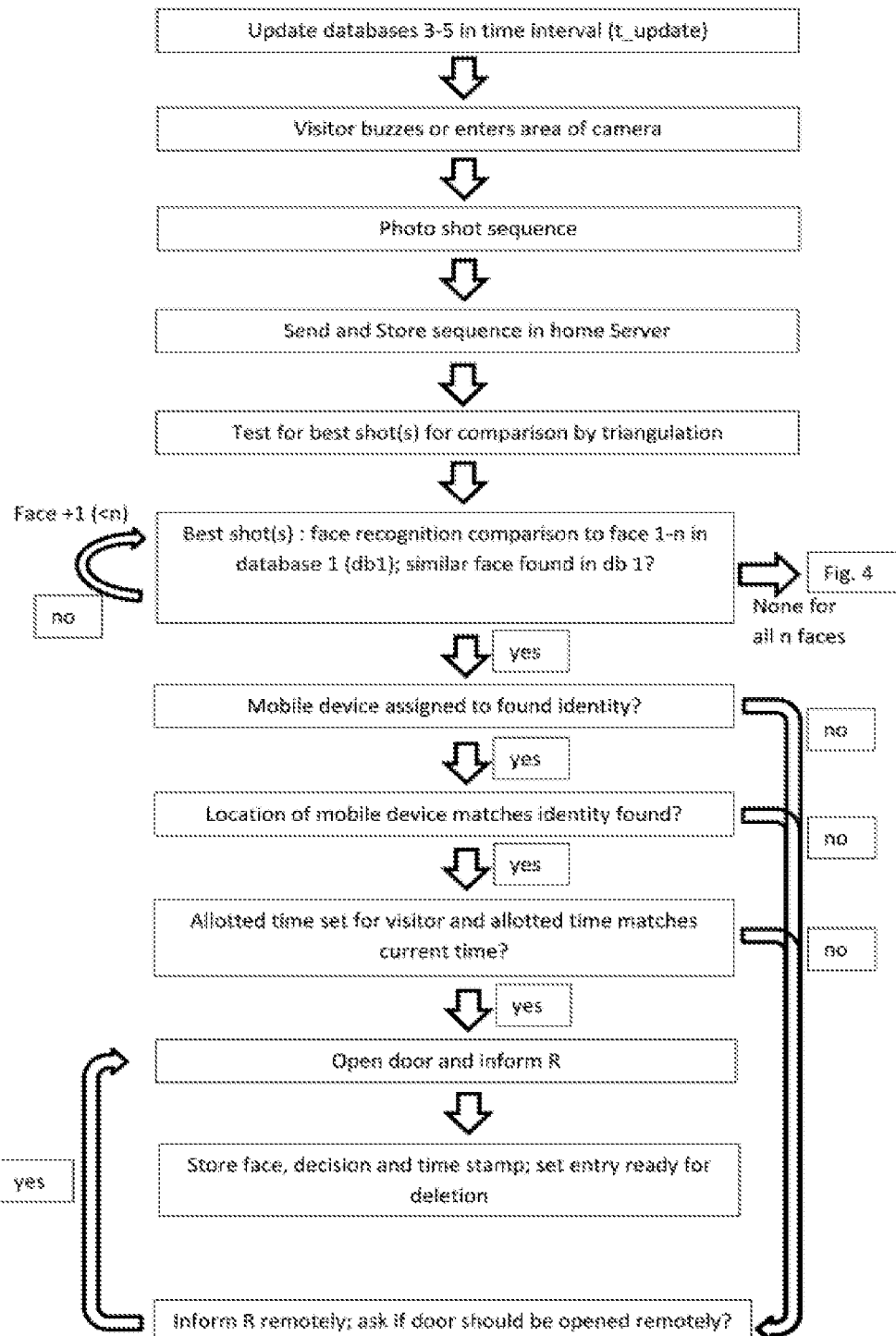
FIG. 3 is a flow chart of a method in accordance with still another preferred embodiment of the present invention.
Figure 4:
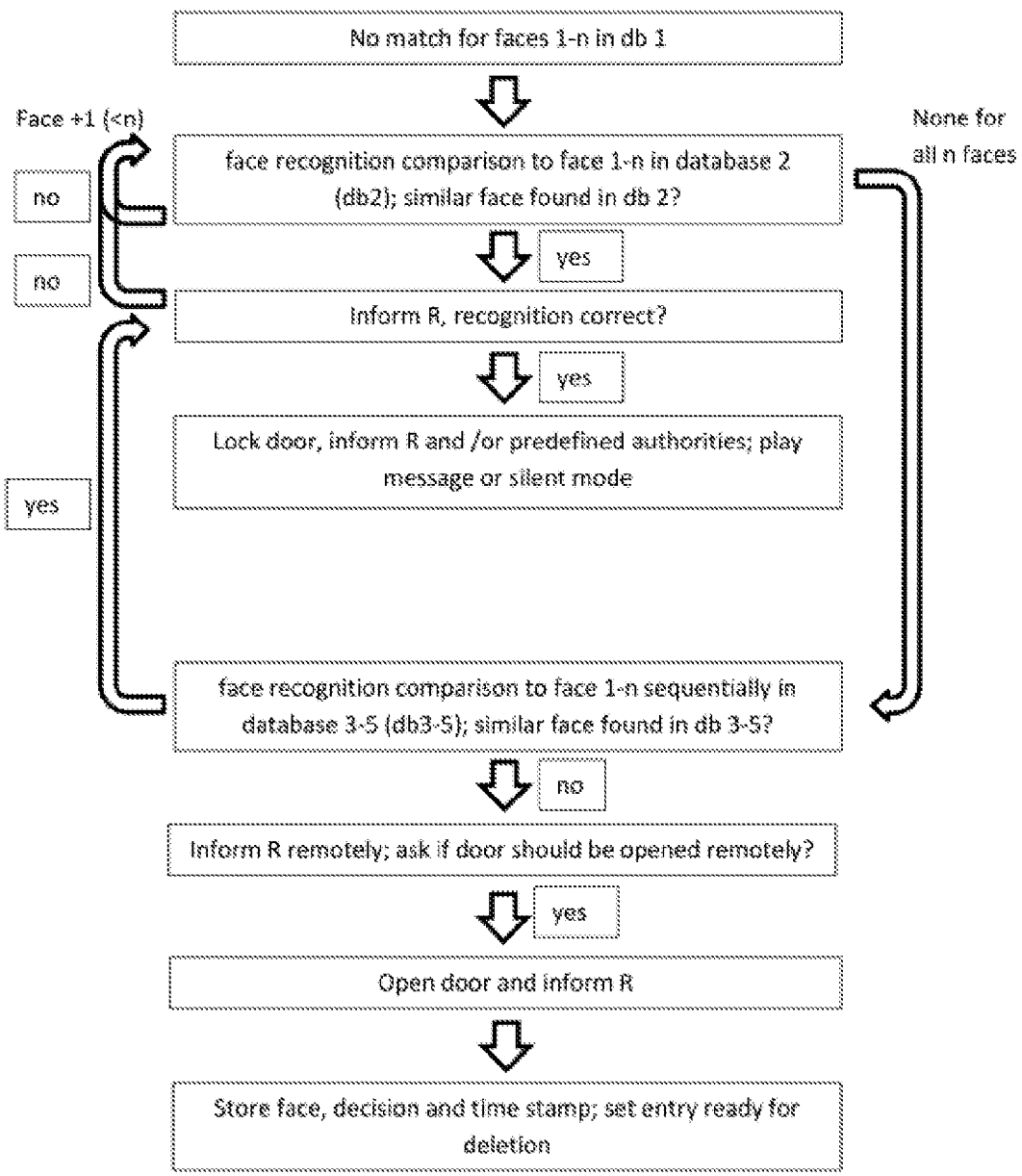
FIG. 4 is a flow chart of a method in accordance with another preferred embodiment of the present invention.

FIGS. 3 and 4 are FIG. 2 flow charts of a method in accordance with another preferred embodiment of the present invention. FIGS. 3 and 4 refer to the case of Movement Detection With the video of the movement in front of the door being transferred to central storage via processing server, server, using movement recognition software detects the presence of at least one person (V1, 2, . . . , n).

If movement, yet no person is detected (e.g. wind blowing trees or animals running by), films can be marked as deletable and at certain intervals automatically or manually deleted.

Photo Snippet Processing

If at least one person is detected approaching the said door and at the latest once presses the buzzer switch, it is detected which of the still snippets is best usable to apply standard face recognition software by among other ways, comparing the triangles between eyes and tip of the nose and eyes and middle of the lower lip and triangle between tip of the nose and the left and right corner of the mouth. The processing server likewise uses triangulation software or another basic face recognition algorithm to vet the photo stills for best face recognition purposes to detect which of the still snippets is best usable to apply standard face recognition software.

In the next step, face recognition software is used to capture the facial features of the person, gender and age range of the person or persons assessed. The details of the face recognition methods per se are well known in the art and may be used and combined according to actual needs.

The faces are compared to the said up to 5 databases:

The chosen best photo snippet(s) are checked against the 5 databases by comparing among other features the triangles between eyes and tip of the nose and eyes and middle of the lower lip and triangle between tip of the nose and the left and right corner of the mouth, assesses gender and age range of the said at least one person or of more persons and using standard face recognition software calculates the probability if the person on the outside is either a person positively marked by the homeowner in database 1—internal positive (DB1), such as friend and family, marked by the home owner as a stalker in database 2—internal negative, or negatively marked by security forces in database 3, database 4 and/or database 5. This sequential method is herein named "photo snippet processing"

The result is transferred back to the interior door unit and presented on the monitor and/or on a smart device such as a smartphone, tablet, TV etc. Then, the homeowner or residents on the inside are presented with several choices on the screen; alternatively, information is transferred to a smart phone or another communication device of the owner, showing the assessments who the person on the outside might be and the photo snippet taken in comparison to the photo stored on the database; the owner can then accept that choice and work correspondingly.

The results may be shown to the resident R as follows:
Database 1 Match

Match in database 1: The photo taken outside; a note and name of the possible match within database 1—internal positive—with the photo and name from within the stored database; the user resident R is then asked if this is correct, wrong or unclear, using the touchscreen and/or his voice, (via voice recognition) or switches the monitor to give his assessment:

if his choice is 'correct', the new photo can be added to the database to better the system;

if his choice is 'wrong', a note is made; there is similarity within the software to lessen future probability calculations;

if his choice is "unclear", the 2 photos remain stored in the remote server for later use, either to have the house owner ask later again, once the identity of the person is confirmed by him later, or until another choice is made on the door.

In case of "wrong" or "unclear", more choices are shown.
Database 2 Match

If there is a match from database 2—internal negative—it is shown as follows:

The photo taken outside; a note that there is a possible match with a person in database 2—internal negative—with the photo and name from within the stored database; the user is then asked if this is correct, wrong or unclear, using the touchscreen, his voice or switches near the monitor he can give his assessment:

if his choice is "correct", the new photo can be added to the database to better the system;

if his choice is "wrong", a note is made, that there is similarity within the software to lessen future probability calculations;

if his choice is "unclear", the 2 photos remain stored in the remote server for later use, either to have the house owner ask later again, once the identity of the person is confirmed by him later, or until another choice is made on the door.

If the choice is "correct", the user has one or more of the following option to choose from:

1. Let in anyway?
2. Play a prerecorded message?
3. Do nothing, yet do not permit entry?
4. Ask to leave a message and how to be reached later on?
5. Same as 1, yet call security neighborhood watch police and or the predefined backup security network?

Database 3, 4, and/or 5 Match:

The same method is used for databases 3, 4, 5. If the resident R is presented with a choice that shows V as a "potentially dangerous person" and finds the comparison between the photo still and the photo in the database 3, 4 or 5 convincing, R can press the "correct" button and choose to share this information; server sends video sequence, still(s) used for comparison or potentially all stills and the photo in the database according to his designation via a communication link either to the predefined backup security network a remote center for checking purposes or immediately to the local authorities such as police or neighbourhood watch, which then in turn can, according to their own assessment, move men to the area in order to have the person checked and/or. Given reasonable cause, arrested, without giving hint to the person about the background procedure running against him.

B) Recording of the Entry in all CasesEvery time the door opens, entry of the person is recorded with a time stamp; while the person enters the building, the video camera continues filming his entry for later purposes and streams it to the remote server. All media sequences and information are now stored on the storage unit remote server.

If user resident R permits entry to the person and falls victim to a fraud or robbery, the video sequence and photo can later during and for criminal discovery and investigation be used to be given to local authorities, who then may decide to have all regional databases of the system updated. As it is probable that the same person will strike again in both a similar area and fashion, police can inform their own colleague departments using the photo taken from the person, giving clues as to the current look and clothing of the villain.
C) Voice Recognition If the face recognition has been successful with a high probability assessment, the voice recognition can be used to double check the results found. D) door lock function when leaving the house a) Short Locking Delay As stated earlier, the door unit can differentiate between the door being opened from the outside and from the inside. Once the handle is turned from the inside, the door locks can be opened without the use of a key, so any person can quickly move out of the house. Once the door falls into place again, the outside handle is still operational. If there is no outside door handle, the door can be pushed again, so the owner resident R, having realized he forgot the key can for a predefined time frame of e.g. 3 to 15 seconds, reopen the door and re-enter the house without a key.

After that time, the handle is no longer operational on the exterior. The door can only be reopened using a key as described later.

After re-entry, within the time-frame, the door is simply locked automatically; it cannot be re-opened from the outside, yet from the inside with the handle.

The door's re-opening is recorded and processed through the databases 1-5 with a time stamp and the video sequence of a short time before and after the opening until the closing of the door. It is marked as either delete-able in a longer interval than normal or only manually delete-able, as in this particular case a third person may hide next to the door, out of the camera shot, and use the time interval to open the door, run inside the house and lock the door from the inside.

If the resident R wears a personal, body worn security device such as described in patent PCT EP 2014 055495 and EP 1679 672 A1 by the same author, which measures among other things his movements, a mismatch between his movements and the renewed door opening can be recognised, transmitted to the device and thus R be informed about the intrusion.

b) Double Lock Interval

After yet another time interval, e.g. 15 seconds to three minutes, after a person leaves the home's interior and does not re-enter, the door bolts fully lock (usually a "double lock" as if turning the key twice in a mechanical lock).

If the full system described in this invention establishes that people are still in the house, this function may be aborted according to presettings.

The combination of 2 locking methods allows for
  the forgetfulness—not only—prevalent in elderly people,
  avoids the need to call for a door opening service, which can be very expensive, and
  warrants the full security of burglary insurance even if the user forgets to lock the door.

Functionality (Software): Update Databases

FIG. 3 may refer to the case, as previously described, once a villain is detected by police, when trying more or less successfully to enter, or after committing a crime inside a home, film sequences and photo stills can be collected (with homeowner or resident consent) from the hidden storage unit. With that information, regional databases can be updated almost instantly by police P, security forces and/or a remote processing center using cloud or standard updating software systems over the internet.

Depending on the severity of the crime, it can be chosen to update even national or international databases.

It is helpful in particular to update databases about when and where the person was last seen; as it is impossible for a person to travel incredibly large distances, say from the east coast of the USA to the west coast in an hour, the probability of a sighting in a specific time frame is decreased, reducing the chance of false alarms.

Functionality: Locking Sequence

The homeowner or resident can also open the locked door using a manual or electronic key, a RFID chip, or a code number which he can type in on the keypad.

If the key carries an electronic distinction, or if the homeowner or resident uses RFID chip or code number which is unique for one person, the system can check in the database if the code or distinction equals the person opening the door. The security unit, concierge service, or the homeowner or resident (or the person whose key etc. has been used) can be contacted, in the latter case, via the smart phone or another communication device.

The RFID chip may be preferably placed on every day, non-reading glasses of the user. Glasses are always used by one person only and their absence is noticed immediately upon leaving the house. If missed, the homeowner or resident returns immediately to the house. As described earlier, if they do not have a key, the short locking delay provides them easy access. Given more and more sensors with unique ID-numbers are presented using RFID to measure body functions, the chip can alternatively be worn anywhere on the body, such as chest, arms or wrist.

Software: Remote System with VPN Connection

If the homeowner or residents are not at home, any information from the door can be transmitted remotely using a secure VPN connection (preferably), to a smart phone or another communications device. This permits the ability to act as if they were present, including opening the door remotely and talking to the person. If resident opens the door while not being physically present, it is particularly important to have the interior tools described later installed in the house.

Software: Concierge System

In standard concierge functionality, a $3^{rd}$ party, the "concierge" CC, is a remote entity similar to a call center, which can transfer all door information directly via the hidden remote server and remotely open the door after securing the rightfulness of the entry request. The latter depends on the instructions left by the homeowner or resident. For example, instructions left with the concierge service may include "every other Wednesday flowers are brought to the house". After checking the ID or face of the carrier, the door can be opened remotely if the homeowner or resident(s) is not at home or if the resident cannot be reached remotely.

Software: Connection Security

To ensure outside security, the hidden server is disconnected from the Internet at idle times. Only once a potential threat is detected or remote resources are requested, the remote server re-connects to the Internet for a short burst of information.

Hardware: Lesser units and fakes

Reading a sign that says 'surveillance and face recognition in progress" a thief, fraudster or other villain cannot know if surveillance is actually happening and to what degree correspondence with the outside is established. From the outside, he or she can see only the standard peephole and the warning sign. The system does not attempt to catch a criminal immediately before or during the execution of his crime, but rather after the crime. This enhances the likelihood of catching him or her afterwards, using his stored profile and substantiating his last known position. Thus, there is the possibility that
  the system has already recognized the villain and security units or the local police have been informed, so the house entered becomes a trap for him, even if he or she is permitted entry;
  that the crime will be spotted later on, and his whereabouts and current looks are used to find him either committing a similar crime nearby or by having local police informed about him or her being in a certain area and then look out for him while he or she cannot even know if the crime has been spotted or not;
  that the act of the crime is supervised and stored, so that the face is recognizable as the person entered the house through the door (or the window) and the act committed in the house is supervised and stored in a place not accessible to the villain, but easily usable with the consent of the house owner once the crime is detected.

Therefore, in an effort to make life and the possibility of detection more unpleasant for a villain, units with lesser functionality can be produced and sold. These units do not necessarily have connections to remote servers; only a camera with internal storage but no monitor, or a camera equipped with a wireless connection to a remote storage unit, but no face or voice recognition software. If a crime is committed inside a home, the stored data can be manually retrieved, handed over to local authorities and used to find the villain and/or to update the databases of other users.

Fake units of the simplest version without monitor for a fraction of the cost of a working unit are employed, as they render only the outside look of the system and the villain cannot be sure, if it is a lesser working model or a fake. For a smaller expense, it is a system to protect himself better from fraud and other criminal activities; for the criminal, he must double check every door before entering. Immediately upon entering, from the outside, he or she cannot see the difference. It will be a community effort make the standard criminal life more arduous.

Method 3: Window Security Module

Placed on a window panel or window pane, the window security module is designed to recognize intruders before they open a window or once they climb through an already-opened window.

The module is a mix between the room surveillance unit and the door surveillance unit, however does not include several modules of either of them.

Once a person is detected in front of the window, the photo still snippet check is carried out. If the person is in database 1 (internal positive), then there is no need for an alarm; if not, information is sent to the security center or the smartphone and/or communication device of the homeowner or resident. The step up snippet system is administered simultaneously, starting with the photo and the video sequence, showing potentially suspicious behavior before entering.

If the adjacent room has room surveillance module installed, the service center can look into that room and talk to the intruder.

Hardware

The hardware consists of a combination of the entry door security module and the room security module, both described above, however without the following items:
the microphone,
the monitor,
the loudspeaker,
the keypad, touchscreen or RFID sensor,
the buzzer,
the inside door mechanism
and the wireless connection.
From the inside home unit only the handle is applied.
Potentially used are
the infrared camera,
the alarm switch, by means of which the user can run from the outside to a window and by pressing the alarm switch notify the security center, the home owner/resident R or police,
the double lock mechanism,
the fire door closing mechanism.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A door locking method comprising:
detecting closing of a door;
keeping a first locking mechanism of said door in an unlocked position for a first predetermined period of time after said closing of the door;
after said predetermined period of time, changing said first locking mechanism into a locked position, wherein said first locking mechanism is enabled to be unlocked using a first key feature;
after a second predetermined period of time starting from said locking of said first locking mechanism, changing a second locking mechanism of said door into a locked position, wherein the first and the second locking mechanism may be unlocked with a key other than said key feature.

2. The method of claim 1, wherein the key feature comprises an RFID-Chip, face features, voice features, or any combination of an RFID-Chip, face features or voice features.

3. The method of claim 2, wherein the key feature or combination of key features comprises face features, wherein the unlocking is enabled if said face feature is comprised in a first database.

4. The method of claim 3, further comprising, if said face feature is not comprised in the first database, comparing said face feature with at least one second database and transmitting a warning signal to a central administration if said face feature is comprised in said second database.

5. The method of claim 1, wherein said first locking mechanism allows for opening said door from both sides when in an unlocked position and locks said door from at least one side when in a locked position.

6. The method of claim 1, wherein the first locking mechanism is an electric strike lock or an electromagnetic lock.

7. The method of claim 1, wherein changing said first locking mechanism into a locked position includes blocking a turning knob or a press handle.

8. The method of claim 1, further comprising sending a locking signal to a monitoring system when said first locking mechanism, said second locking mechanism, or both said first and second locking mechanisms has/have been changed into a locked position.

9. The method of claim 1, further comprising checking whether said door is reopened during said first predetermined period of time,
and, if said door is reopened during said predetermined period of time, detecting a closing of said door and then changing said first locking mechanism into a locked position.

10. The method of claim 1, further comprising if a resident wears a personal, body worn security device, which measures the resident's movements, a mismatch between the resident's movements and the renewed door opening can be recognized, transmitted to the device and thus the resident is informed about the intrusion.

11. The method of claim 4, wherein said databases are disconnected from the Internet at idle times, and wherein once a potential threat is detected or remote resources are requested, the databases re-connect to the Internet for a short burst of information.

12. A system, comprising:
a door including:
a first locking mechanism,
at least one driving element enabled to move said first locking mechanism between an unlocked and a locked position, a close detecting element configured to detect the closing state of said door;

wherein said system is adapted for
- detection of the closing of said door via said close detecting element;
- keeping said first locking mechanism of said door in an unlocked position for a first predetermined period of time after said closing;
- changing said first locking mechanism into a locked position via said at least one driving element after said predetermined period of time;
- a computing unit adapted for, unlocking said first locking mechanism when enabled by a key feature; and a second locking mechanism and at least one further driving element enabled to move said second locking mechanism between an unlocked and a locked position, the at least one further driving element being arranged to change said second locking mechanism of said door into a locked position after a second predetermined period of time starting from said locking of said first locking mechanism, wherein said first locking mechanism and said second locking mechanism may be unlocked with a key other than said key feature.

13. The system of claim 12, further comprising:
a camera arranged in or on the door.

14. The system of claim 12, further comprising means for communicating data via at least one suitable data transmission technique.

15. The system of claim 12, wherein said at least one driving element of said first locking mechanism, said at least one further driving element of said second locking mechanism, or said at least one driving element and said at least one further driving element of said first and second locking mechanisms, respectively, includes/include a timer, wherein said first predetermined period of time, said second predetermined period of time or both said first and second periods of time is/are determined by said timer.

16. The system of claim 12, wherein said driving element includes a connection adapted for receiving a driving command.

17. The system of claim 12, wherein said first locking mechanism is an electrical strike or an electromagnetic lock.

18. The system of claim 12, wherein said second locking mechanism is a bolt lock.

19. A non-transitory storage medium containing computer program code which if executed by a computer is suitable to perform a method according to claim 1.

* * * * *